US012310481B2

(12) United States Patent
Vidal Tasa et al.

(10) Patent No.: US 12,310,481 B2
(45) Date of Patent: May 27, 2025

(54) BLOTTER, KIT AND METHOD FOR CREATING A PERSONALIZED PERFUME

(71) Applicant: ANTONIO PUIG S.A., Hospitalet de Llobregat (ES)

(72) Inventors: Jordi Vidal Tasa, Barcelona (ES); Irene Rodenas Sainz De Baranda, Barcelona (ES); David Panyella Costa, Barcelona (ES)

(73) Assignee: ANTONIO PUIG S.A., Hospitalet de Llobregat (ES)

( * ) Notice: Subject to any disclaimer, the term of this patent is extended or adjusted under 35 U.S.C. 154(b) by 291 days.

(21) Appl. No.: 18/087,288

(22) Filed: Dec. 22, 2022

(65) Prior Publication Data

US 2023/0131061 A1 Apr. 27, 2023

Related U.S. Application Data

(63) Continuation of application No. PCT/EP2021/066779, filed on Jun. 21, 2021.

(30) Foreign Application Priority Data

Jun. 22, 2020 (EP) .................................... 20382543

(51) Int. Cl.

| | |
|---|---|
| ***A45D 34/02*** | (2006.01) |
| ***A45D 40/00*** | (2006.01) |
| ***A61Q 13/00*** | (2006.01) |
| *A45D 34/00* | (2006.01) |

(52) U.S. Cl.

CPC ......... *A45D 34/02* (2013.01); *A45D 40/0087* (2013.01); *A61Q 13/00* (2013.01); *A45D 2034/002* (2013.01); *A45D 2034/007* (2013.01)

(58) Field of Classification Search

CPC .. A45D 34/02; A45D 2034/002; A45D 34/00; A45D 2200/25; A61Q 13/00

See application file for complete search history.

(56) References Cited

U.S. PATENT DOCUMENTS

| | | | | | |
|---|---|---|---|---|---|
| 1,546,302 | A * | 7/1925 | Mehigan | A45D 33/006 | 434/377 |
| 2,239,145 | A * | 4/1941 | Creston | G09F 5/042 | 206/232 |
| 2,822,082 | A * | 2/1958 | Breckwoldt | A45D 34/00 | 206/568 |

(Continued)

FOREIGN PATENT DOCUMENTS

| | | | |
|---|---|---|---|
| CN | 202664620 | U | 1/2013 |
| JP | 2017111111 | A | 6/2017 |
| WO | 2018231960 | A1 | 12/2018 |

OTHER PUBLICATIONS

High World Packaging Store, 200PCS Small Pack Flower Shape Perfume blotter Tester Cards Strips for Fragrance Tester, Dec. 29, 2019, 1 page.

(Continued)

*Primary Examiner* — Ernesto A Grano

(74) *Attorney, Agent, or Firm* — Edell, Shapiro & Finnan, LLC

(57) ABSTRACT

A blotter, a kit and a method for creating a personalized perfume. The blotter may include delimited two-dimensional regions on its surface such that a quantity of each scent deposited on the units may be determined.

15 Claims, 6 Drawing Sheets

(56) References Cited

U.S. PATENT DOCUMENTS

| | | | | | |
|---|---|---|---|---|---|
| 3,917,456 | A * | 11/1975 | Eckstein | G01N 33/98 | 206/569 |
| 3,942,667 | A * | 3/1976 | Thomas | B65D 81/022 | 215/334 |
| 3,980,203 | A * | 9/1976 | Dearling | A47K 10/42 | 239/289 |
| 4,277,024 | A * | 7/1981 | Spector | A61L 9/12 | 206/466 |
| 4,369,882 | A * | 1/1983 | Schluger | B65D 75/28 | 206/459.5 |
| 4,496,051 | A * | 1/1985 | Ortner | G09F 3/04 | 206/37 |
| 4,611,611 | A * | 9/1986 | Beal, Jr. | A45D 40/26 | 132/320 |
| 4,785,932 | A * | 11/1988 | Checke | A61J 7/04 | 206/534 |
| 4,817,860 | A * | 4/1989 | Shapiro | B65D 27/00 | 229/80 |
| 4,848,378 | A * | 7/1989 | Moir | A45D 40/0087 | 132/319 |
| 4,884,719 | A * | 12/1989 | Levine | A45D 40/0087 | 221/25 |
| 4,925,033 | A * | 5/1990 | Stoner | A61J 1/16 | 206/209 |
| 5,031,764 | A * | 7/1991 | Meador | A45D 34/02 | 206/823 |
| 5,109,984 | A * | 5/1992 | Romick | B65D 83/0463 | 206/532 |
| 5,626,155 | A * | 5/1997 | Saute | A45D 40/00 | 434/377 |
| 5,778,901 | A * | 7/1998 | Abrahamian | A45D 29/00 | 206/229 |
| 5,971,351 | A * | 10/1999 | Swaab | A45D 40/00 | 249/117 |
| 6,016,916 | A * | 1/2000 | Ortner | B05B 11/0038 | 206/823 |
| 6,463,786 | B1 * | 10/2002 | Behan | A61B 5/00 | 600/303 |
| D551,804 | S * | 9/2007 | Allen | D28/78 | |
| 7,614,405 | B2 * | 11/2009 | Allen | A45D 33/006 | 132/295 |
| 8,499,960 | B2 * | 8/2013 | Paterson | A45D 34/02 | 220/524 |
| 9,050,380 | B2 * | 6/2015 | Mallochet | A45D 34/04 | |
| 10,242,391 | B2 * | 3/2019 | Fleming | C11B 9/00 | |
| 12,060,212 | B2 * | 8/2024 | Kang | A45D 40/24 | |
| 2006/0196100 | A1 | 9/2006 | Laudamiel-Pellet et al. | | |

OTHER PUBLICATIONS

TRAC sample collection training video: Collecting and storing dried blood spots, Mar. 12, 2015, 1 page.
International Search Report, PCT/EP2021/066779, Jul. 26, 2021, 3 pages.

* cited by examiner

BLOTTER, KIT AND METHOD FOR CREATING A PERSONALIZED PERFUME

CROSS-REFERENCE TO RELATED APPLICATIONS

This application is a continuation of International Application No. PCT/EP2021/066779, filed Jun. 21, 2021, which relates to and claims the benefit and priority to European Application No. 20382543.5 filed Jun. 22, 2020.

FIELD

The present disclosure relates to testing of perfumes. The present disclosure also relates to the mixing of different smells, perfumery ingredients, notes, bases or accords and to the testing of the mixture. The present disclosure particularly relates to blotters, kits, systems and methods for creating a personalized perfume, and more in particular to blotters, kits, systems and methods that facilitate the determination of a quantity of the scents included in a blotter.

BACKGROUND

Blotters or fragrance test strips are widely used in the perfume industry to test different perfumes. A perfume blotter is usually a strip of blotting paper which may absorb a perfume or scent and may help a person to smell it and decide whether he or she likes it. For instance, a person may take a perfume bottle, spray part of its content on a blotter, fan the blotter close to the nose and smell it to decide whether he/she wants to buy that perfume.

However, a person may find that the available perfumes in a store do not fully match his/her expectations. For instance, a person may like certain scents of one or more perfumes, but maybe not the perfume as a whole. Or a person may like the smell of more than one perfume and may like to combine them to create a personalized perfume. Or even a person may have in mind several preferred scents and he or she may desire to test how they smell together, to then buy a perfume with the tested scent combination if pleased with the result.

In these and similar cases, the current available blotters present various drawbacks, a main drawback being reproducibility. I.e., it is not guaranteed that a person receives a personalized perfume with a previously tested and approved smell. This is due to the difficulty of quantifying the actual proportion of a scent in a combination of scents deposited on the blotter strips, or even of quantifying an actual amount of a scent deposited on a blotter strip. For instance, when spraying a blotter strip, part of the scent usually does not fall on the strip. And even if it does, it is complicated to know how much of a specific scent a strip actually has.

Blotters are also used by perfumers to test different scent combinations during a perfume creation process. For example, a perfumer may deposit five different scents, each scent on a different blotter strip. Five different droppers may be used to this end. Perfumers may have hundreds of scent bottles from which to choose scents to mix. In addition to blotter strips, they may use other means to blend scents. For instance, they may use flasks, beakers and pipettes. Nevertheless, dosing liquids presents multiple challenges. Dirty material, ambient contamination, cross-contamination, spillages and stains are common difficulties encountered by perfumers.

Combining several scents in a reproducible manner is a difficult and delicate task, which the current blotter strips do not facilitate. A customer may not know how to indicate to a staff member the desired proportions of scents included in a desired personalized perfume. Likewise, a staff member may not know how to determine such proportions either.

The present disclosure aims to provide improvements in blotters for perfume testing and creation.

SUMMARY

In a first aspect, a blotter for creating a personalized perfume is disclosed. The blotter comprises a surface including a plurality of units indicated on the surface, a unit being a delimited two dimensional region of the surface for deposition of a scent such that a quantity of each scent deposited on the units may be determined to create a personalized perfume.

In accordance with this aspect, a blotter with which the proportions of scents included in a scent combination performed in the blotter may be known is provided. An amount of scent for a particular perfume may thus be easily quantified by e.g. counting filled in units. The limitation of depositing perfume to these units, or delimited two dimensional (2D) regions, makes the quantification and the reproducibility possible. The number of units filled with each scent may be communicated to a staff member so that a personalized perfume with the appropriate quantities of each scent may be created for the customer.

Herein, a blotter may include any substrate that is able to absorb and release a scent, e.g. a liquid scent. In some examples, a blotter may be a blotting paper, e.g. comprising cellulose. In some other examples, a blotter may include porous materials such as ceramic, porous plastic, wood, fabric and even concrete. If solid scents are used, a blotter may not need to absorb and release the smell of the solid scents.

Throughout this disclosure, a scent may mean a substance, e.g. a liquid or solid, with a certain smell that may be deposited on a blotter and combined with other different scents in order to create a (personalized) perfume. A perfume may therefore be understood as a substance, e.g. a liquid or solid, which results from combining two or more scents, and in particular the smells of the two or more scents. Liquid perfumes may be either alcohol based, water based, or oil based. Solid scents or solid perfumes may include a solid substance able to absorb and release a smell. In an example, a solid scent or perfume is scented wax. Also, a new perfume may be obtained by mixing e.g. two existing commercial perfumes. In such a case, each of the two already existing perfumes may be considered a scent. The term "scent" is also used herein to cover complete perfumes (e.g. commercially available perfumes), perfumery ingredients (e.g. bergamot, citron, neroli, sandalwood, . . . ), basic combinations of perfumery ingredients, which may also be known as "notes" (e.g. citrus, floral, musk, . . . ) and more complex combinations of perfumery ingredients or combinations of notes, which may be also known as "accords" (e.g. oriental, amber, . . . ).

A determined quantity of scent may be expressed in several ways. In an example, a quantity of scent may be a proportion, e.g. scent A substantially represents a half (or 50%) of a perfume. In another example, a quantity of scent may represent a volume, e.g. scent A is substantially 0.1 milliliters (ml).

The quantification of a scent may be related to the surface area of a unit. In this way, a correspondence between the surface area of a unit and a quantity of scent may be established. In this regard, depositing a scent on a unit may include "filling" the unit with the scent. Throughout this disclosure, "depositing", "filling" and "applying" may be used interchangeably, and "depositing/applying a scent on/to a unit" and "filling a unit with scent" may mean "substantially covering a total area of a unit with a scent in a substantially homogeneous way". Also, the amount of scent deposited on different units having a substantially same area shall be substantially the same. For example, if a unit has an area of substantially 3 squared centimeters ($cm^2$), it may be understood that substantially 3 $cm^2$ are covered in a substantially homogeneous way each time that a unit with such an area is filled with scent.

In case of a solid scent, it may be understood that each time that a scent is deposited on a unit, the same amount of scent or at least a known amount is deposited. This applies at least to a scent having a substantially same smell. For example, a solid scent may be scented ceramic, e.g. in form of ceramic beads. Herein, it may be understood that an amount of a scent corresponds to e.g. a volume of a bead. Each ceramic bead that is substantially equal (e.g. in size, shape, and weight) to the remaining ceramic beads may be assumed to a substantially same amount of smell.

In an example, ceramic beads of smell A are substantially circular and have a diameter of 2 millimeters (mm), and ceramic beads of smell B are substantially circular and have a diameter of 3 mm. Other shapes and materials may be possible for solid scents. For instance, a solid scent may include polyether block amide (PEBA), which may be also known as PEBAX®. PEBA may be shaped into substantially cubic beads in some examples. In some other examples, solid scents may include other polymers, e.g., one or more of ethylene-vinyl acetate (EVA), ethylene-butyl acrylate (EBA) and polyvinyl chloride (PVC). Still in some other examples, a solid scent comprises one or more porous plastics obtained by extrusion or sintering, e.g., at least one of polypropylene (PP) and polyethylene (PE). These examples may be combined.

A unit may e.g. be a printed square on a blotter. In some examples, all the units of a blotter have a substantially same area, and optionally a substantially same shape. For instance, a blotter may have 20 units, each unit having a substantially squared shape, and each unit having an area of 2 $cm^2$. Having the totality of the units of a blotter with a same area eases the quantification of a scent deposited on the units. This is in particular evident if all the units have a substantially same shape. For instance, a person may take the blotter of the example above and deposit scent A on 3 units, scent B on 5 different units and scent C on 2 different units. This person may therefore know that the perfume would have a 30% of scent A, a 50% of scent B and a 20% of scent C. The calculation may take more time to do if the area of the units is different.

In another example, different shapes with substantially equal areas are indicated on a blotter. The use of different shapes may be more visually attractive to a customer and may facilitate the counting of units. In this regard, a shape may correspond to a scent. For instance, in an example there are five different shapes: square, circle, triangle, diamond and star. Each shape corresponds to a different scent and a costumer may easily count filled in squares, circles and so on, such that the quantities of the scents used may be quickly determined. If a large number of scents may wish to be used, e.g. more than five scents, it may be preferable to use units with a same shape, as this may prevent leaving unused units.

Herein, the indication of units on the surface of a blotter may be understood as making the units noticeable, e.g. visually noticeable, to a person who wants to create a perfume. In an example, the units are printed to the blotter surface. In yet further examples, a blotter may be introduced into a template, wherein the template has a predetermined pattern of areas that are open (so as to access the blotter) and areas that are occluded. The open areas may be filled in with a perfume for testing.

Irrespective of whether the units have a same area and/or a same shape, in some examples some units, and optionally all the units, form a lattice. Throughout this disclosure, a lattice may be understood as an ensemble of units adjoining to each other, with at least one edge of each of the units being in contact with (i.e. touching) at least one edge of a different unit of the ensemble. In an example, a lattice may be a grid. For instance, in the example above of units having a squared shape with an area of 2 $cm^2$, the units may form a grid. Placing the units forming a lattice enables providing more surface of the blotter for depositing scent, which may be more efficient.

In some examples, the surface of the blotter further includes one or more fold lines and the blotter is configured to be folded such that a three-dimensional (3D) structure including two or more faces may be assembled. Therefore, a 3D structure may be obtained by folding e.g. a substantially flat sheet of blotting paper. Herein, a mark on a blotter surface along which the blotter may be folded may be referred to as "fold". A face may be understood as a surface delimited by one or more edges, an edge corresponding to an end of the blotter or to a fold. A face of the blotter may include one or more units.

A 3D blotter, i.e. a blotter with a 3D structure, makes it possible to increase the number of available units to be filled with scents in an easy to handle manner. Specifically, it facilitates smelling a blotter which may include a large number of scents. This may be particularly useful for a perfumer, whose scent palette may have hundreds of different scents from which he may wish to combine tens of scents.

In a second aspect, a method for creating a personalized perfume is disclosed. The method comprises providing a blotter as described throughout this disclosure and two or more different scents; depositing a first scent on one or more first units; depositing a second scent on one or more second units different from the first units, the second scent being different from the first scent; smelling the blotter; and determining a quantity of each scent deposited on at least the first and second units.

Therefore, a person such as a costumer, a staff member helping the costumer or a perfumer may deposit different scents on a blotter as described herein and determine a quantity, e.g. a percentage or a proportion, of the deposited scents in order to create a perfume according to the preferences of a costumer or a perfumer. A personalized perfume may then be prepared in a reproducible manner.

The scents which may be deposited on the blotter may be kept in different receptacles, e.g. a jar or a bottle. In an example, a receptable is a jar and the different scents are contained in different jars. A scent may be taken out of its receptacle and deposited on one or more units by a dispenser. A dispenser may e.g. be a dropper or a capillary tube. A dispenser may dispense a scent in a substantially linear way. The incorporation of a linear dispenser may facilitate a homogeneous deposition of a scent on the blotter, which may increase the precision and reliability of the quantification of a scent.

In some examples, a dispenser which dispenses a scent in a substantially linear way is a marker. A marker may include any type of pen. A marker may be a convenient tool to apply scent on a blotter while at the same time evaporation of the contained scent is prevented. Scent evaporation may occur e.g. when opening a jar for taking a scent from it with a dispenser. If a jar is covered by a dropper, evaporation may also occur when using the dropper for depositing the scent. Also, an open receptacle may be inadvertently dropped, spilling its content and maybe breaking. Therefore, keeping and applying the scents in markers may be an easy way to avoid, or at least reduce, possible problems which may arise with the use of other receptacles and dispensers whereas the precision of scent determination is enhanced.

In some examples, determining a quantity of each scent deposited on at least the first and second units comprises counting a number of first units and a number of second units. Counting units filled with scent may be a simple way to know the proportions of the scents used for creating a perfume which smells substantially equal to the combination previously performed on the blotter. In an example, a customer deposits several scents on the blotter and writes down the number of units filled with each of the scents used. By indicating this information to a staff member of the shop, the costumer may afterwards receive a perfume with a substantially same smell than the one he/she liked.

In some examples, the first scent has a wavelength different from the wavelength of the second scent. The scents having different wavelengths may help in the identification of the scents and the quantities of scent that were used.

In practice any scent or perfume will have a plurality of wavelengths, because it will comprise a plurality of ingredients. Throughout this disclosure, the fact that "a scent has a wavelength" may mean that the scent has been given a known wavelength which may be identified later on in order to differentiate the scent from other scents. For instance, an additive, e.g. a colorant/color additive, may be added to a scent such the scent may be discerned visually from other scents. In an example, the known wavelength may lie in the ultraviolet (UV) portion of the electromagnetic spectrum. Markers may be used as perfume dispensers as explained before, and they may be UV markers such that a color is only visible under UV light. In examples wherein image processing is used to determine a perfume composition, UV light may be used.

In some of these examples, the wavelengths of the first and second scents belong to the visible portion of the electromagnetic spectrum. In other words, the first and second scents have different colors. For example, a first colorant may have been added to the first scent and a second colorant, different from the first colorant, may have been added to the second scent. A costumer may then quickly and easily identify the number of units filled with each scent. This may be useful if the costumer, or the person counting units, forgets about the number of units filled with each scent. This may happen if several scents are used. By being able to visually distinguish the deposited scents, the counting can be done again or checked.

If a large number of scents are available, colors may not be easily distinguished one from another. In such a scenario, color may enable knowing which units have already been filled, but it may not always be possible scent quantification just by visual inspection. In these or other similar situations, the determining may comprise using image processing or spectrophotometry. A digital image may be made in an automated manner, and the digital image may be processed to identify different colors and therewith different scents. By using spectrophotometry, the deposited scents may be known and quantified. Other technology which may be able to distinguish colors and/or quantify the area covered by each color may be used.

In order for a person to decide whether he/she likes the aroma resulting from the scents deposited on a blotter, he or she may smell the blotter. This may be done in different ways. In an example, smelling includes moving the blotter close to a person's nose. Moving may include fanning the blotter. In another example, smelling includes using a fan. For instance, a fan may be placed near, e.g. next to or below, the blotter such that the smell of the blotter is dispersed. Still in another example, smelling includes placing the blotter on a movable support and moving the support. A support may e.g. be a stick or a bar. The blotter may be rotatable around the support. By moving the support, the blotter may act as a fan. More than one way of smelling the blotter may be performed, e.g. the examples above may be combined.

In relation with the methods herein described, an automated ordering system may be provided, in which a user may introduce the mixture of the perfume that he/she liked. Such an order may then be transmitted electronically to a production center in which a personalized perfume may be prepared. In some examples, the quantities of each scent may be automatically determined by the same system or in a perfume trial station, such that a user only has to confirm an order.

In a further aspect of the present disclosure, a perfume tester or perfume trial station is provided. The perfume tester comprises a slot configured to receive a blotter support. The perfume tester further comprises a mixing chamber. When the blotter support is introduced into the slot, the blotter held in the blotter support is arranged within the mixing chamber. The perfume tester further comprises a fan configured to provide an air flow to pass through the mixing chamber such that a perfumed air flow passes through a diffusor.

The blotter support may be such that, when the blotter is arranged in the blotter support, the units indicated on the surface of the blotter are distanced from the blotter supports. The blotter may comprise a surface including a plurality of units indicated on the surface, a unit being a delimited two dimensional region of the surface in which a scent may be deposited such that a quantity of each scent deposited on the units may be determined to create a personalized perfume.

The blotter support may comprise guides which can be received by mating grooves in the slot in the perfume station. The blotter support may comprise a receptacle or receiving area in which the blotter may be placed, held or suspended.

The blotter when arranged in the mixing chamber may have a distance of at least 1 cm or a few centimeters to the upper, lower and side walls of the mixing chamber. The blotter may be a blotter according to any of the examples described herein.

The diffusor may be sized and shaped such that a homogenous perfumed air flow may be delivered to a user.

In yet a further aspect, a kit for perfume testing is provided. The kit may comprise a set of differently scented dispensers. The dispensers may be markers. The kit may furthermore comprise a plurality of blotters. The blotters may be according to any of the examples described herein. A kit may furthermore comprise a perfume tester according to any of the examples described herein.

With such a kit, a user may easily create and test his own scent combinations. When a user finds one or more perfumes that of his/her, he/she may place an order to the store, or even to the factory, e.g. online for a perfume according to the tested mixture of scents.

In yet a further aspect of the disclosure, a method for composing a perfume is provided. The method comprises providing one or more blotters according to any of the examples disclosed herein and providing a plurality of scents. The method then comprises receiving an input of the composition of a scent of a tested blotter. The method may then comprise providing perfume according to the composition of the scent.

The receiving an input may include a user determining the composition of the tested blotter and the user providing the composition. The receiving an input may include automatically determining the composition.

Testing of the blotter may be performed may include dispensing a plurality of scents on a blotter and smelling. The dispensing and smelling may both be performed according to any of the examples disclosed herein.

BRIEF DESCRIPTION OF THE DRAWINGS

Non-limiting examples of the present disclosure will be described in the following, with reference to the appended figures, in which.

The figures refer to example implementations and are only be used as an aid for understanding the claimed subject matter, not for limiting it in any sense.

DETAILED DESCRIPTIONS

Figure 1:
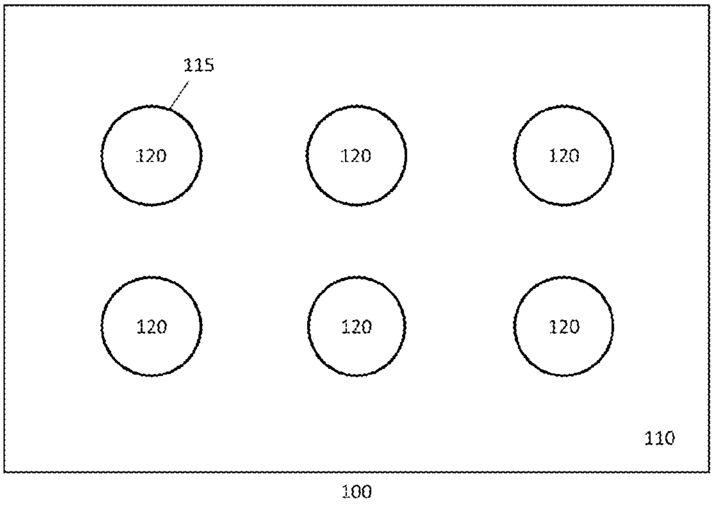
FIG. 1 schematically represents a blotter according to a first example.

FIG. 1 schematically represents a blotter 100. Blotter 100 includes a surface 110 which comprises a plurality of units 120 indicated on the surface 110. Having a 2D delimited region indicated on the surface 110 makes possible to quantify scents deposited on the units 120, e.g. the proportions of scents applied to the units 120. This quantification enables the creation of a perfume with a substantially same smell than the one obtained by depositing scents on the blotter 100. A personalized perfume may therefore be reliably created. Blotter 100 may be odorless for enabling an appropriate and reliable smelling of the scents deposited thereon.

In some other examples, a blotter 100 may have a predefined smell or scent. Such a predefined scent may be known as a base scent. A base scent may impregnate a blotter entirely. I.e., the smell of the base scent perceived by a person smelling the blotter may not depend on which portion of the blotter is smelled. A predefined scent may mean that a base scent comprised in a blotter 100, e.g. the composition and the amount of the base scent, is known in advance, e.g. at least by a blotter provider. If a blotter incorporates a base scent, the scents subsequently deposited on the units of the blotter may be smelled in combination with the base scent. As the base scent is a predefined scent in a predefined quantity or concentration, by determining the quantity of subsequent scents deposited on the units of the blotter, the quantities of the base scent and the subsequent scents to be used for creating a personalized perfume may be easily obtained. The scents deposited on the units of a blotter already including a base scent may be referred to as topping scents.

FIG. 1 includes six units 120. A unit 120 may be delimited by an edge 115. An edge 115 provides a visual guide to know until where a unit 120 is to be filled with a scent. Such an edge 115 may be printed on a blotter 100, e.g. with a continuous line such in FIG. 1. An edge 115 may comprise other line styles, e.g. an edge may be dashed. Also, an edge 115 may be marked on the blotter 100 in other ways. For instance, an edge 115 may include micro perforations through its surface 110. A unit 120 may also be indicated by providing a region of the surface 110 with features visually distinct from the remaining surface 110, e.g. by coloring a region of the surface 110. In an example, a unit 120 is a region of the surface 110 with a different color or pattern from the rest of the surface 110, e.g. the surface 110 may be white and a unit 120 may be grey. Or e.g. the surface may be white and a unit 120 may be white and may include black crisscrossed lines or other hatchings. Other options are of course possible. Also, not all the units 120 need to be indicated in a same manner.

In an example, units 120 may include recesses. I.e., one or more units 120 may not necessarily be in the plane of the blotter surface 110, but they may be e.g. in a lower plane. This may ease the filing of units 120 with solid scents. In this example, FIG. 1 may be seen as a top view of a blotter 100, instead as of a substantially flat blotter 100, and the blotter 100 may be imagined as an ice tray or as holder with a number of recesses or holes. The depth of the units 120, i.e. a distance between surface 110 and a unit 120, may be varied, e.g. according to a size of solid scents. Different distances between surface 110 and different units 120 in a same blotter 100 are possible.

All the units 120 of FIG. 1 have a substantially same area and a substantially same shape (circle). Having all the units 120 with a substantially same area and shape may facilitate the determination of deposited scents. In other examples, units 120 may have different areas and/or shapes.

For example, a blotter 100 may include units 120 with substantially a same area but distinct shapes. This may provide for an even easier quantification as a shape may be linked to a particular used scent, e.g. scent A may be linked to the shape "circle", scent B may be linked to the shape "square" and so on. A person may then count "squares", "circles", etc. to quickly determine the proportions of the scents applied to the blotter 100.

In another example, a blotter 100 may comprise units 120 with different areas. In such an example, units 120 with smaller areas may be used to quantify small quantities of scents, e.g. intense scents, and units 120 with bigger areas may be used to quantify substantially larger quantities of scents, e.g. less intense or preferred scents. In an example, a substantially small area may correspond to (liquid) scent volumes of 0.05 ml or less, and in particular less than 0.02 ml. In this example, a substantially bigger area may correspond to (liquid) scent volumes of more than 0.05 ml, and in particular more than 0.2 ml. As in the example of the previous paragraph, different areas may be linked to different unit 120 shapes. For instance, each of the "circular" units 120 may represent substantially a 0.5% of the area of all the units 120 included in the blotter 110 and each of the "squared" units 120 may represent substantially a 5% of the area of all the units 120 included in the blotter 100. The percentages, volumes or surface areas may be indicated on the blotters for ease of use.

In general, the area and shape of the units 120 may be varied and adapted as desired.

Although six units 120 are shown in FIG. 1, a different number of units 120 may be comprised in a blotter 100. In an example, a blotter has twenty units 120. Including more units 120 in a blotter 100 increases the number of scents that may be applied to its surface 110 and the number of scent combinations and proportions that may be obtained. For instance, a perfumer may wish to have a blotter 100 with more than one hundred units 120.

If the units 120 are separated, such as in FIG. 1, the number of available surfaces to cover with scent is more limited than where units 120 are close to one another or when they are touching or adjoining. Herein touching may refer to having one or more edges 115 in contact, but without unit 120 overlap.

In an alternative example, the blotter paper 100 may be blank and may be introduced in a template. The template may have open areas coinciding with units 120 so that these units may be used for creating a scent mixture.

Figure 2:
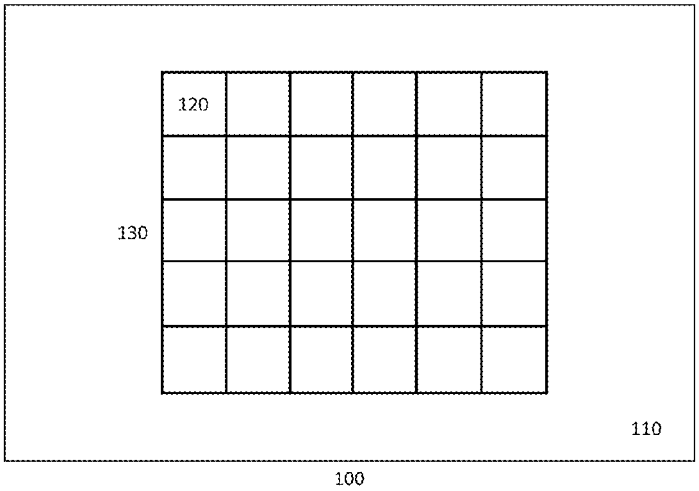
FIG. 2 schematically represent a blotter according to a second example.

FIG. 2 shows an example wherein all the units 120 of a blotter 100 touch among them and form a lattice 130. In another example, some units 120, and not all the units 120, form a lattice 130.

In FIG. 2, lattice 130 is in particular a grid 130. The grid 130 is formed by units 120 being delimited by substantially parallel and perpendicular lines, i.e. columns and rows but a lattice 130 may in general include any ensemble of units 120, the units 120 adjoining to each other, with at least one edge of each unit being in contact with (i.e. touching) at least one edge of a different unit 120 of the ensemble. The greater the contact between units 120 is, the more compact the lattice 130 will be. This may help to increase the surface available for depositing scent on a blotter 100.

Like in the example of FIG. 1, the shape and/or the area of units 120 may be equal or different when units 120 form a lattice 130. In FIG. 2 all the units are squares of a substantially same area, but any other shape that delimits a region of a surface 110 is possible. Also, any pattern, i.e. disposition of the units 120 on the surface 110 or overall shape of a lattice 130, is possible. This overall shape is a rectangle in FIG. 2, but in some other examples a shape of a lattice 130 including units 120 may e.g. be a spiral, a snake, or an asterisk. A blotter 100 may include more than one lattice 130.

Figure 3A:
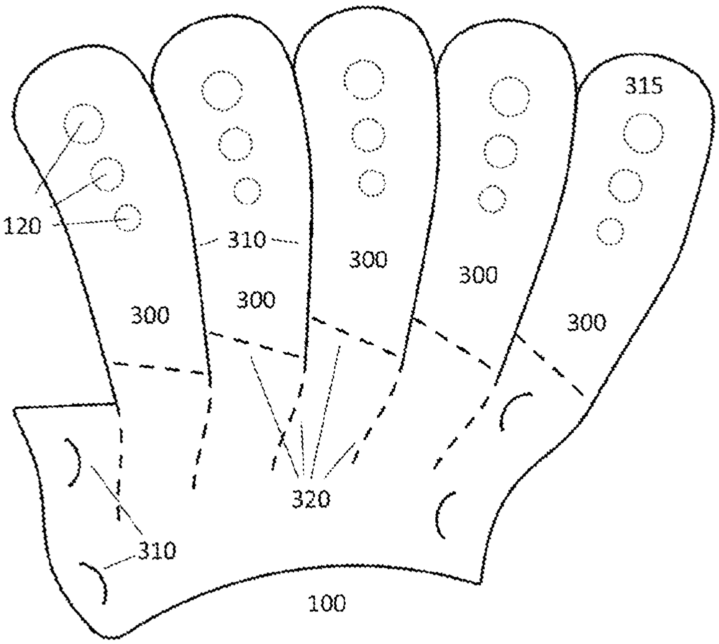
FIG. 3A schematically illustrates an example of blotter which may be folded.

A surface 110 of a blotter 100 may also be folded, and optionally cut. In the example of FIG. 3A, the blotter 100 may be folded along lines, or folds, 320. In addition, the blotter may be cut along lines 310. The marks for folding and/or cutting may be indicated by any type of line, e.g. continuous, dash or dotted, and the marks may be printed or indicated in a different way. For instance, micro perforations on a blotter 100 may facilitate to fold the blotter surface 110, or to cut it without the need of scissors. Folding, and optionally cutting, a blotter 100 may enable the assembly of a 3D structure (3D blotter). Varying where to fold and/or cut a blotter controls the shape and features of the 3D blotter once assembled. Units 120 may be indicated on a face 300.

Figure 3B:
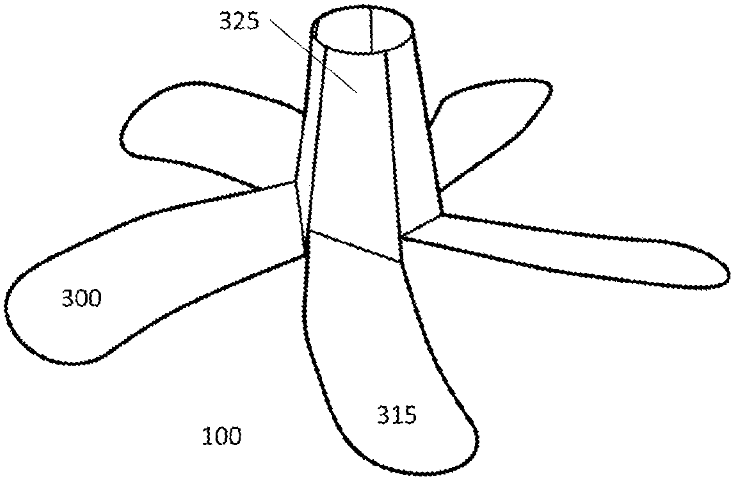
FIG. 3B schematically shows a result of a folded blotter of FIG. 3A.

After cutting and folding the blotter 100 of FIG. 3A, the blotter 100 of FIG. 3B may be obtained. A blotter 100 may have two or more faces 300. In the example of FIG. 3B, blotter 100 includes a base 325 and five blades 315, each blade 315 including two faces 300. The blotter 100 of FIG. 3B helps to combine and spread the smell of the scent deposited on units 120. Such a blotter may be placed on a rotatory shaft thanks to its substantially truncated conical base 325. In this example, the blotter 100 may at the same time for a fan for creating a scented air flow. The blotter may be placed on a shaft and an (electric) motor may be put in motion.

In an example, the surface of blade 315 may form a unit. In another example, the surface of the blade 315 may include several units, such as indicated in FIG. 3A.

Figure 4A:
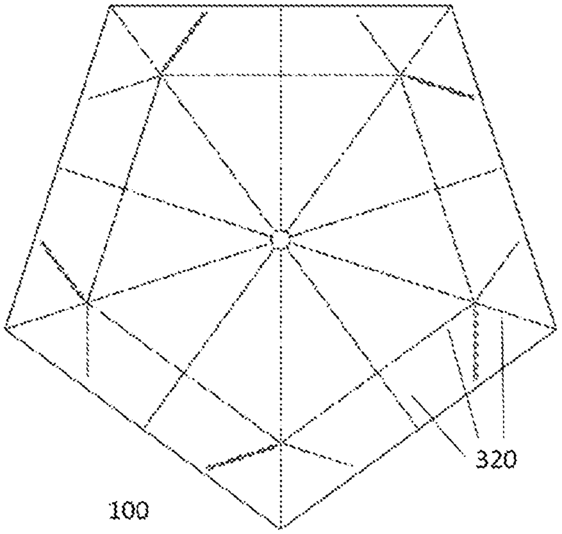
FIG. 4A schematically illustrates an example of blotter which may be folded.
Figure 4B:
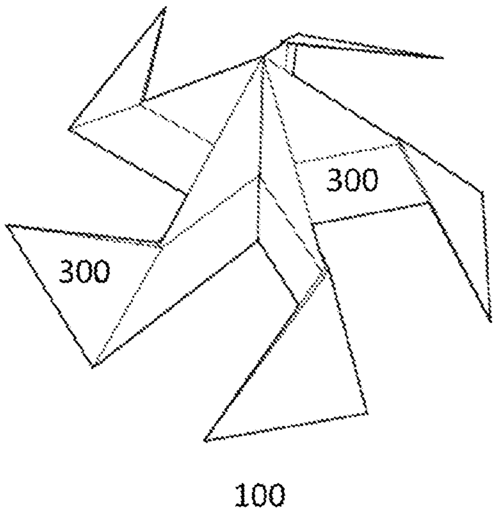
FIG. 4B schematically shows a result of a folded blotter of FIG. 4A.

FIG. 4A illustrates an example of another blotter 100, having folds 320. After folding, the 3D structure of FIG. 4B may be obtained.

Many different shapes for 3D blotters are possible. For example, a 3D blotter may be or comprise a polyhedron, e.g. a cube. In this example, each of the six faces of the cube may contain a plurality of units 120, e.g. in the form of a grid 130. The cube may have a projection, e.g. on one of its corners, which may be grabbed by a person and which may enable the rotation of the cube around an axis passing through the protrusion. In another example, a projection may be on one of the outer faces 300 of the cube. This surface may not have units 120 on it. Still in some other examples, the projection may be a truncated cone. In this last case, rotation may be performed with the help of a machine, e.g. comprising a motor connected to a rotatable shaft. The use of 3D blotters facilitates to smell a large number of scents deposited on the blotter, e.g. by a perfumer.

A shape and a size of a blotter 100, be it foldable or not, may be adapted, e.g. according to a number of scents that may be deposited on its surface 110.

In examples of foldable blotters, the folds are such that the areas which may be filled with a scent are well defined, in that their surface area is known and reliable. When a user prepares his/her perfume by filling out the surface areas resulting after folding, the proportions of the different scents may then still be easily determined.

Figure 5:
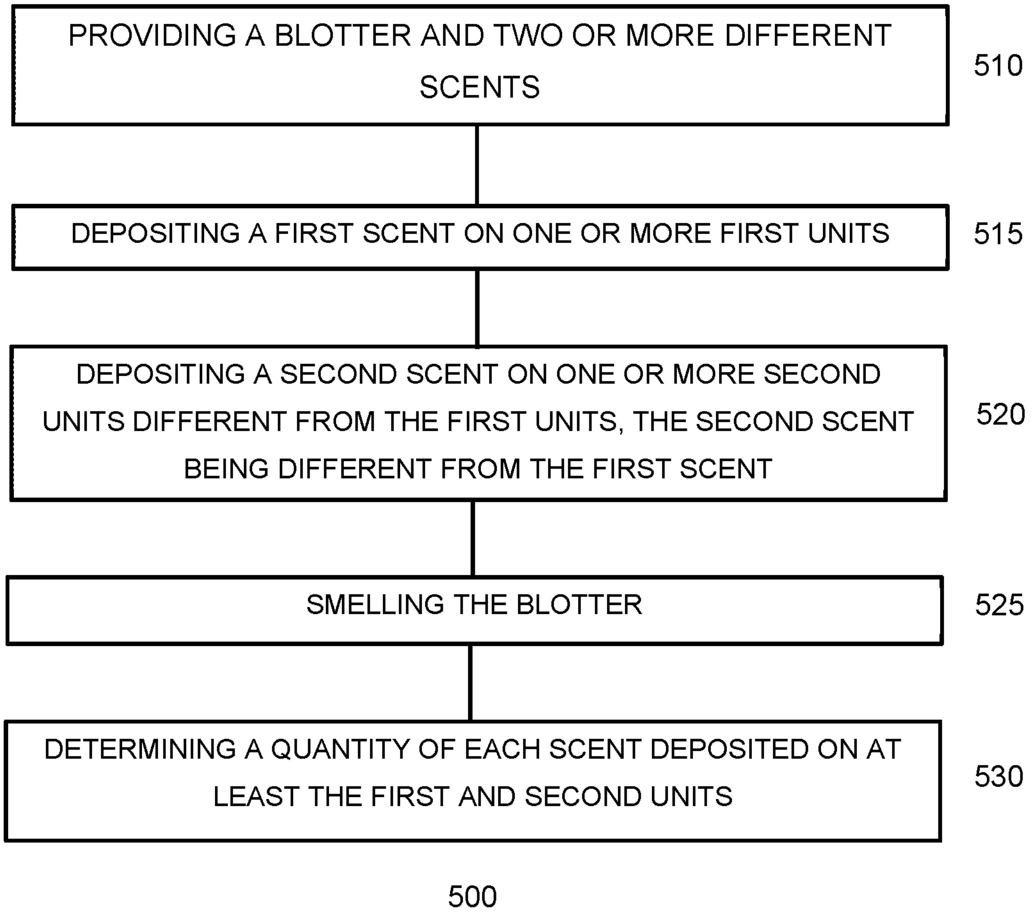
FIG. 5 illustrates a flow chart of a method for creating a personalized perfume.

FIG. 5 illustrates a flowchart of a method 500 for creating a personalized perfume. Method 500 includes, at block 505, providing a blotter 100 according to any of the examples disclosed herein and two or more different scents. The blotter 100 may comprise a blotter 100 such as the ones disclosed in FIGS. 1-4B.

Method 500 further comprises, at block 510, depositing a first scent on one or more first units 120. A scent may be deposited on one or more units 120 by a dispenser. A dispenser, or dispensing means, may include e.g. one of a dropper, a capillary tube, and a (thin) paint brush. These or other dispensing means may ease depositing a scent on one or more units in a controllable way.

If the blotter 100 includes a base scent, the first (and subsequent) scents deposited on the units of the blotter may be referred to as topping scents.

In some examples, a dispenser may deposit a scent in a substantially linear way. This may mean that the dispenser deposits a substantially constant amount of scent per unit of time or per unit of area when used to fill a unit 120. A substantially linear scent application may improve the reliability of the quantification of scents.

In an example, a dispenser, and in particular a dispenser configured to deposit a scent in a substantially linear way, may be a marker. A marker may include any kind of pen.

Figure 6:
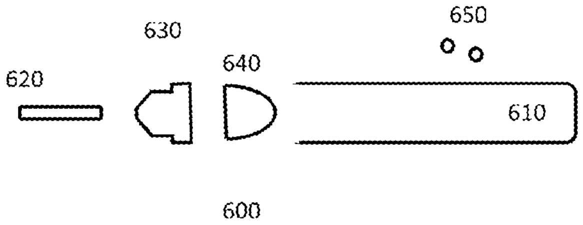
FIG. 6 schematically illustrates a marker which may be used to store and deposit scent on a blotter according to an example.

In an example illustrated in FIG. 6, a marker 600 comprises a body 610 which may contain scent, e.g. a hollow tube opened in an end, a tip 620 through which the scent may be deposited in a substantially linear way, a head 630 and a valve 640. A valve 640 may serve to dose the content of the body 610. A valve 640 may include a spring. A scent may be placed directly inside the body 610 or it may be included in a cartridge or wadding (not shown) which may be inserted into the body 610. In the first case, one or more balls 650, e.g. made of steel, may be added to help to keep or recover homogeneity in the scent. This may be useful when a scent includes several components which may separate from one another over time. These components may be mixed and integrated again when shaking the marker 600. In another example, e.g. when the scent is incorporated into a wadding, a valve 640 may not be used.

Using a marker 600 may provide a comfortable, clean and easy way for storing, transferring and depositing scent or filling with it one or more units 120. If the scents were provided on bottles or similar receptacles, one would need to open them to extract the scents and then pass the scents to a blotter 100. In the meantime, one or more bottles would remain open and their content may evaporate. In such a case, some scents may be mixed in the air, which may lead to a misleading perception of the smell of the scents in the bottles. This may complicate the selection of new scents to put on the blotter 100. Also, the nose may become saturated with the smells and a smell of the scents deposited on the blotter 100 may not be correctly perceived. In addition, one may unintentionally lose scent when transferring it to a blotter 100. Using markers 600 may avoid, or at least reduce, such problems, thereby facilitating the process of selecting, transferring and depositing scents on a blotter 100.

In a test setting e.g. in a store, a plurality of markers with different known scents may be provided to a potential client. The markers may have different scents, and the compositions or tones may be indicated on the side. A potential client may draw or fill out different units of the blotter. In some cases, the markers may have and/or deposit different colors.

A perfume testing kit may comprise a plurality of differently scented markers and a plurality of blotters. The perfume testing kit may optionally comprise a perfume testing station according to any of the examples herein described as well.

Method 500 further comprises, at block 515, depositing a second scent on one or more second units 120 different from the first units 120, the second scent being different from the first scent. By depositing a different scent on one or more different units 120, the area of the units 120 may be used to quantify at least the two scents.

The depositing of (at least) a second scent may be performed with any dispenser or dispensing means, e.g. anyone of the ones mentioned above.

Method 500 further comprises, at block 520, smelling the blotter 100. Testing the smell of the scents deposited on the blotter 100 may help to decide whether the chosen scents and the chosen proportions fulfil the expectations. Smelling may be done in several ways.

In an example, smelling may be done by manually moving, e.g. fanning, the blotter close to a person's nose. For instance, a costumer or a perfumer may take the filled blotter 100 and fan it close to his or her nose to smell it.

In another example, smelling may be done by using a fan. I.e., a blotter 100 and a fan may be placed close to each other such that when the fan is on, an air current created by the fan disperses and mixes the scents deposited on the blotter 100.

Figure 7A:
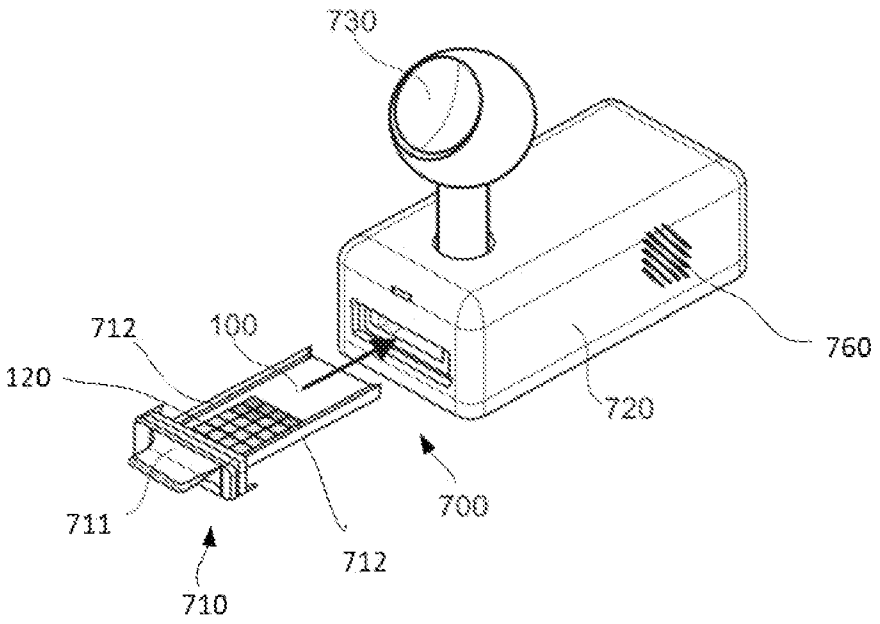
FIG. 7A schematically illustrates a perfume trial station according to an example.

In such an example, a fan may be incorporated in a perfume tester or perfume trial station. An example of perfume trial station 700 is illustrated in FIG. 7A. The perfume trial station 700 comprises a blotter support 710, a mixing chamber 720 and a smelling diffusor 730. As indicated in FIG. 7A, a blotter 100 may be placed in a blotter support 710 and the blotter support 710 may be introduced into the mixing chamber 720.

A blotter support 710 may include a base 711 and two guides 712 substantially perpendicular to the base 711. The guide 712, and optionally the base 711, may have grooves along through which a blotter 100, in particular a substantially flat blotter paper 100, may be inserted.

The guides 712 may be such that the blotter support can be easily inserted and guided in a slot in a perfume trial station. The base 711 of the blotter support may serve as a stop when the blotter support is inserted in the slot and may rest against a housing of the perfume trial station.

Such a blotter support 710 may avoid the contact between the deposited scents and the perfume trial station 700. Accordingly, scent contamination of the individual parts of the trial station 700, and the trial station 700 as a whole, may be avoided or at least reduced. Preventing scent contamination can be beneficial so that each user may smell the scents of its blotter 100 only, instead of smelling scents left by other scents put into the trial station 700 by other users before.

The units 120 may be relatively far removed from the edges of the blotter, such that when the blotter is placed in the blotter support 710, a sufficient distance is maintained, so that also the blotter support does not get contaminated. E.g. the outer border of 1-5 cm, specifically 2 to 5 cm may be free along the perimeter.

In some examples, a blotter support 710 may comprise more than one structure, e.g. two or more piled up structures including guides and support for the blotter. These structures may be joined along a vertical direction, e.g. bases 711 from different support structures may be joined. Thus, more than one blotter 100 may be supported by the blotter support 710. By placing one blotter 100 per hat-shaped structure, one may modify an initial scent combination already made. Thus, if a person does not like, or at least completely like, a scent combination performed, he/she may not throw away the blotter 100 used, but he may include additional scents on a second blotter 100 and test if the new perfume smells as desired. Such an action may be performed more than once, e.g. by using additional blotters 100 and additional hat-shaped structures.

Figure 7B:
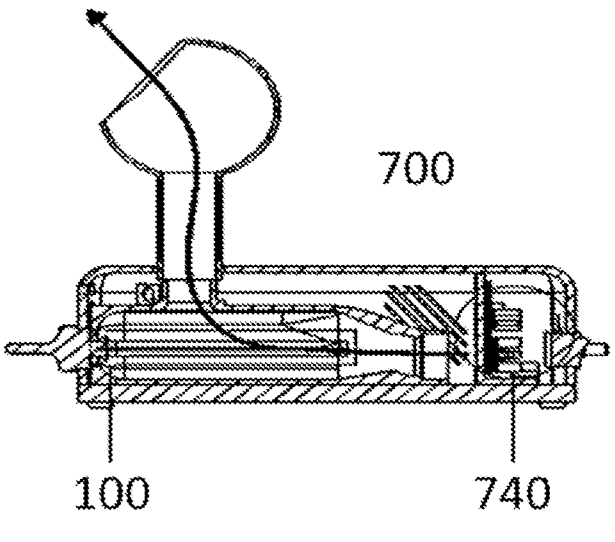
FIG. 7B schematically illustrates a section of the perfume trial station of FIG. 7B.

FIG. 7B shows a transversal cut along the length of the perfume trial station 700 of FIG. 7A with the blotter 100 inserted into the mixing chamber 720. When a fan 740 is activated, the smell of the scents deposited on the blotter 100 may be dispersed and mixed, and e.g. a customer may smell the blotter 100 by approaching his or her nose to the smelling diffusor 730. The perfume trial station may include one or more air inlets 760 into the housing.

As commented above, the deposited scents do not touch an interior of the mixing chamber 720. Also, the fan 740 may keep working for a certain period of time, e.g. 5 minutes, after smelling the blotter 100 and taking it out of the mixing chamber 720. This may avoid, or at least reduce, scent contamination of the trial station 700. In addition, trial station 700 may additionally deliver a signal, e.g. acoustic, which warns that a blotter 100 has been left in the mixing chamber 720 for a certain period of time after which some of the components of the trial station 700 may not remain odorless. This may also contribute to decrease scent contamination.

The perfume trial scent station 700 and its components are just one example, and other stations 700, blotter support 710, mixing chamber 720 and/or smelling diffusor 730 are possible. For instance, the smelling diffusor 730 may change in shape or the blotter support 710 may be adapted to incorporate blotters 100 with different sizes and even 3D blotters.

In some other examples, smelling a blotter 100 may include placing the blotter 100 on a movable support and moving the support. A movable support may comprise for instance a rotatable shaft. Moving the support may be performed manually or may be performed with the aid of a machine.

Figure 8:
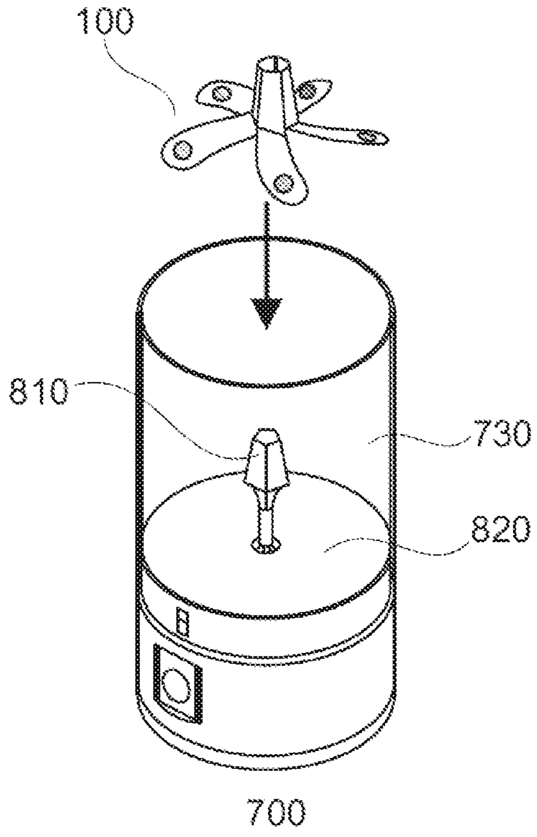
FIG. 8 schematically shows a perfume trial station according to another example.

FIG. 8 shows another example of perfume trial station including a movable support which is a shaft 810. The perfume trial station 700 of FIG. 8 may be used for smelling some 3D blotters, e.g. a blotter comprising a base 325 such as the blotter 100 of FIG. 3B. The perfume trial station 700 of FIG. 8 includes a base 820, a shaft 810 on which a blotter 100 may be placed and which may be rotatable in a direction substantially perpendicular to the base 820 and a smelling diffusor 730. Base 820 may include a motor in order to rotate the shaft 810.

In the example of FIG. 8, the blotter 100 acts as a fan and an additional fan, as e.g. in the example of FIG. 7, is not needed. Also, placing a blotter 100 on such a shaft 810 may avoid scent contamination of the trial station 700 due to the absence of contact between the deposited scent and the components of the station 700. A clearance between the tips of the blades 315 of the blotter and a side wall of the perfume trial station may be sufficient for avoiding perfume on the blades 315 entering into contact with a side wall. In an example this may be at least 1 cm, and specifically at least a few cm. The motorized or driven shaft may act as a blotter support in this example.

In some examples, the shaft may comprise an elongated conical portion with increasingly smaller diameter towards the tip of the shaft. If blotters with conical bases 325 with different diameters are used, multiple blotters may be positioned on the same shaft, while maintaining a vertical distance between them.

In yet a further example, a shaft 810 may comprise more than one protuberance along its length such that more than one blotter 100 may be placed on the trial station 700. The size of the protuberances may increase with distance from the base 820 in one example for facilitating the placement of various blotters 100 along the shaft 810. The shape and size of the protuberances may vary along the shaft 810 for the same reason. Similarly to the example of multiple hat-shaped structures included in the blotter support 710 of FIGS. 7A and 7B, having more than one protuberance along a shaft 810 may facilitate retouching an initial scent combination instead of having to start from scratch.

If a 3D blotter 100 is to be assembled, folding the blotter 100 and assembling a three-dimensional, 3D, structure may be done after depositing the different scents on the units 120 and before smelling the scent combination.

It is noted that the perfume trial stations of FIGS. 7A, 7B and 8 could be used with blotters that do not include units 120, i.e., the advantages of such stations may be applied to any kind of blotter, no matter if it comprises delimited regions for depositing scents or not. Any known blotter may benefit from such trial stations, and specifically from the fact of avoiding contamination between blotter, blotter support and perfume trial station.

Method 500 further comprises, at block 525, determining a quantity of each scent deposited on at least the first and second units 120. By quantifying the scents deposited on the blotter 100, a person may recreate a perfume with a substantially same smell in a reproducible way.

In some examples, determining a quantity of each scent deposited on at least the first and second units 120 comprises counting a number of first units and a number of second units 120. In such an example, a costumer who wishes to buy a personalized perfume may fill different units of a blotter 100 with different scents. For example, he or she may use two different markers 700 to fill four units 120 with scent A and two units 120 with scent B. He may write down the number of units 120 filled with each scent and he or she may smell the blotter 100 to test the combination made. If the smell is pleasant, he or she may indicate the number of units 120 filled with each scent to a staff member so that a personalized perfume may be manufactured and delivered to him or her. In this case, by simply counting filled units, both the client and the staff member would quickly see that the desired scent combination includes two thirds of scent A and one third of scent B.

Such a counting may be applied with any number of scent used, but the counting and determining may get more complicated with an increasing number of scents used and/or units 120 filled.

In some examples, the first scent has a wavelength different from the wavelength of the second scent. In some of these examples, the wavelengths of the first and second scents belong to the visible portion of the electromagnetic spectrum. In other words, the first and second scents may have different colors.

If the scents have different colors, counting filled units 120 may become easier. Also, if the number of scents used is high and the colors may not be effortlessly distinguished, e.g. by a perfumer who may use tens of different scents, determining may comprise using spectrophotometry. The use of spectrophotometry may enable the distinction of the scents used and the quantities in which they were used. In an example, an ultraviolet (UV)-visible spectrophotometer is used. In another example, an infrared (IR spectrophotometer is used. In some other examples, other technology which makes possible to scan the blotter 100 and differentiate areas with different colors, or in general different wavelengths, may be used to facilitate the scent quantification.

Method 500 may be performed by any person wishing to create a personalized perfume, e.g. a costumer or a perfumer. More than two scents, e.g. tens of scents, may be deposited on a blotter and smelled. If the resulting scent combination is not satisfactory, other attempts may be made until obtaining the desired result. Such a process may be performed in an easy and clean way.

It is also envisaged that a person, e.g. a customer, may not need to go a perfume store to do the mixing and testing of scents. In this regard, a set of blotters 100 and a set of dispensers, e.g. markers 600 including different scents, may be sent to the user so that he can easily create and test his own scent combinations. When he/she finds one or more perfumes that he/she likes, he may place an order to the store, or even to the factory, e.g. online. One or more blotters according to the examples herein described may be included in the same kit.

Some or all the blotters of the kit may be odorless in some examples. In other examples, some or all the blotters may comprise a base scent. A person may add one or more topping scents to the units of the already perfumed blotters. For example, a plurality of blotters comprising the same base scent may be included in the kit. The composition and amount of the base scent of each already perfumed blotter may be the same, such that a person may always start with a same base smell. This may also facilitate the creation of a personalized perfume by a perfume manufacturer, as the variations in composition of the personalized perfume would only depend on the topping scents added to the blotter.

A kit may comprise blotters with more than one base scent, e.g. two, three or more different base scents. For example, a first plurality of blotters with a first base scent may be included, and a second plurality of blotters (different from the first plurality of blotters) with a second base scent (different from the first base scent) may be included in the kit. In this way, a person may have different base smells onto which build to create a personalized perfume. A base smell may of course be odorless, is the kit includes odorless blotters and these ones are used.

In addition, a perfume trial station, e.g. such as the one 700 in FIG. 8, may be part of the kit too.

In some examples, a perfume testing kit may include a plurality of stickers. The stickers may comprise different scents. For example, scents may be encapsulated or carried by the stickers such that when acted on the stickers, their smell may be perceived by a person. Such kits may for example be used in a perfume store or may be used at a person's home.

Several stickers may comprise a same scent. In this way, a scent may be tried in more than one perfume test. For example, if ten stickers include a same scent, that scent could be tried in ten different attempts to create a perfume. It is also possible to use more than one sticker having a same scent in a same attempt. For example, if there is a scent that a person likes a lot, two or more stickers of that scent may be attached to a card.

In some examples, the stickers may include a front peelable layer. When a portion or the entire layer is peeled off, a smell of the scent of a strip may be noticed by a person. In some other examples, the stickers may be configured to release a scent when they are rubbed or scraped.

When a customer receives a kit with stickers, he or she may arrange one or more of the stickers on a surface, e.g. on a paper or card. Once the desired stickers are adhered to a surface, they may be smelled. For example, a card where the stickers have been attached to, may be approached to the nose and smelled. One or more cards may be included in the kit.

Stickers may have identifiers such that a scent can be linked to the sticker. For example, stickers may have labels, e.g. names of scents. A person may therefore know which scents are included in a perfume that he or she has previously smelled. These scents can be indicated when placing an order for creating a personalized perfume. Other identifiers are possible. For example, each scent can be indicated by a color, shape or drawing of a sticker. More than one type of identifier can be used simultaneously. For example, stickers of a certain color may represent a specific accord, and different patterns or drawings in stickers of the same color may represent different notes of that specific accord.

The stickers may be adhesive strips, e.g. rectangular adhesive strips. In some examples, the stickers may include a back peelable layer. Removing the back peelable layer exposes an adhesive layer of the sticker by which the sticker may be adhered to a surface. In some other examples, an adhesive may be provided separately and the stickers may be glued to a surface by applying the adhesive to a sticker and then the sticker to the surface.

In general, the stickers may have any suitable shape. The shape and size of the stickers may vary between them, but if all stickers have a same size and shape, it may be easier to stick them in a same paper or card and to determine the composition of prepared perfume or mixture of scents.

The stickers may comprise a certain amount of scent which is known, e.g. to the providers of the kit, for example certain milliliters. Thus, when a customer indicates the stickers or scents for ordering a personalized perfume, proportions of the desired scents may be known.

The stickers may be included in the kit instead of one or more blotter with delimited units. As the amounts of scent included in the stickers is known, providing delimiting regions for depositing scents is not required. Avoiding depositing scents on a blotter may enable a cleaner and easier process for a costumer.

A perfume trial station comprising at least a mixing chamber can be provided to a costumer in addition to the stickers.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

For reasons of completeness, various aspects of the present disclosure are set out in the following numbered clauses:

Clause 1. A method for creating a personalized perfume comprising:
providing a blotter for creating a personalized perfume, the blotter having a surface including a plurality of units indicated on the surface, a unit being a delimited two dimensional region of the surface for deposition of a scent such that a quantity of each scent deposited on the units may be determined to create a personalized perfume;
providing two or more different scents;
depositing a first scent on one or more first units;
depositing a second scent on one or more second units different from the first units, the second scent being different from the first scent;
smelling the blotter; and
determining a quantity of the first and second scents deposited on at least the first and second units.

Clause 2. The method of clause 1, wherein a scent is deposited on one or more units by a dispenser and particularly wherein the dispenser dispenses a scent in a substantially linear way.

Clause 3. The method of clause 2, wherein the dispenser is a marker.

Clause 4. The method of any of clauses 1-3, wherein determining a quantity of each scent deposited on at least the first and second units comprises counting a number of first units and a number of second units.

Clause 5. The method of any of clauses 1-4, wherein the first scent has a first color additive, and the second scent has a second color additive.

Clause 6. The method of any of clauses 1-5, wherein the determining comprises using spectrophotometry.

Clause 7. The method of any of clauses 1-6, wherein smelling includes at least one of: moving the blotter close to a person's nose, using a fan and placing the blotter on a movable support and moving the support.

Clause 8. An odorless blotter for creating a personalized perfume comprising:
a surface including a plurality of units indicated on the surface, a unit being a delimited two dimensional region of the surface for deposition of a scent such that a quantity of each scent deposited on the units may be determined to create a personalized perfume;

wherein all the units have a substantially same area.

Clause 9. The blotter of clause 8, wherein the plurality of units is printed on the surface of the blotter.

Clause 10. The blotter of any of clauses 8 or 9, wherein all the units of a blotter have a substantially same shape.

Clause 11. The blotter of any of clauses 8-10, wherein the surface of the blotter further includes one or more fold lines and the blotter is configured to be folded such that a three-dimensional, 3D, structure including two or more faces results, and optionally wherein the faces form the units.

Clause 12. A kit for creating a personalized perfume comprising a blotter, wherein the blotter comprises a surface including a plurality of units indicated on the surface, a unit being a delimited two dimensional region of the surface for deposition of a scent such that a quantity of each scent deposited on the units may be determined to create a personalized perfume; and a perfume trial station includes a blotter support for holding the blotter, and a mixing chamber in which the blotter support can be introduced.

Clause 13. The kit of clause 12, wherein the perfume trial station further includes a fan for providing an air flow.

Clause 14. The kit of clause 12 or 13, wherein the perfume trial station includes a slot for receiving the blotter support, such that the blotter is arranged inside the mixing chamber.

Clause 15. The kit of clause 12, wherein the perfume trial station includes a drive for rotating a shaft, and the blotter forms a fan configured to be positioned on the shaft.

What is claimed is:

1. A method for creating a personalized perfume comprising:

providing a blotter having a surface including a plurality of units indicated on the surface, each of the plurality of units being a delimited two dimensional region of the surface;

depositing a first scent on one or more first units of the plurality of units;

depositing a second scent on one or more second units of the plurality of units different from the one or more first units, the second scent being different from the first scent;

smelling the blotter; and determining a quantity of the first and second scents deposited on the respective one or more first units and one or more second units, the first scent has a first color additive that gives the first scent a first color, and the second scent has a second color additive that gives the second scent a second color different than the first color.

2. The method for creating a personalized perfume according to claim 1, wherein the first scent is deposited on the one or more first units by a first dispenser and/or the second scent is deposited on the one or more second units by a second dispenser.

3. The method for creating a personalized perfume according to claim 2, wherein the first dispenser is a first marker and the second dispenser containing the first scent is a second marker containing the second scent.

4. The method for creating a personalized perfume according to claim 2, wherein each of the first and second dispensers is configured to dispense in a linear way.

5. The method for creating a personalized perfume according to claim 1, wherein determining the quantity of the first and second scents includes counting the one or more first units and counting the one or more second units.

6. The method for creating a personalized perfume according to claim 1, wherein determining the quantity of the first and second scents comprises using spectrophotometry to identify the first and second colors.

7. The method for creating a personalized perfume according to claim 1, further comprising moving air over the one or more first units and the one or more second units to facilitate the smelling.

8. The method for creating a personalized perfume according to claim 1, wherein the moving of air is performed by a fan.

9. A kit for creating a personalized perfume, the kit comprising:

a blotter having a surface including a plurality of units indicated on the surface, each of the plurality of units being a delimited two dimensional region of the surface for deposition of a first scent on one or more first units of the plurality of units and for deposition of a second scent on one or more second units of the plurality of units, the plurality of units being sized and shaped so that a quantity of each of the first and second scents may be determined by counting the units to create the personalized perfume; and a perfume trial station including a blotter support for holding the blotter, and a mixing chamber, the blotter support being configured to move between a first position inside the mixing chamber and a second position outside the mixing chamber.

10. The kit according to claim 9, wherein the perfume trial station further includes a fan for providing an air flow across the mixing chamber.

11. The kit according to claim 9, wherein the perfume trial station includes a slot for receiving the blotter support for placement of the blotter inside the mixing chamber.

12. The kit according to claim 9, wherein the perfume trial station includes a drive for rotating a shaft, and the blotter is in the form of a fan having an end portion positioned on the shaft.

13. The kit according to claim 9, further comprising first and second markers, the first marker containing the first scent and configured for depositing the first scent on the one or more first units, the second marker containing the second scent and configured for depositing the second scent on the one or more second units.

14. The kit according to claim 9, wherein all the plurality units have a substantially same size and shape.

15. The kit according to claim 9, further comprising a plurality of scented stickers.

* * * * *